(12) United States Patent
Vaishnavi et al.

(10) Patent No.: US 12,192,065 B2
(45) Date of Patent: Jan. 7, 2025

(54) TRACING AND EXPOSING DATA USED FOR GENERATING ANALYTICS

(71) Applicant: Huawei Technologies Co., Ltd., Shenzhen (CN)

(72) Inventors: Ishan Vaishnavi, Munich (DE); Clarissa Marquezan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/890,072

(22) Filed: Aug. 17, 2022

(65) Prior Publication Data

US 2023/0044850 A1 Feb. 9, 2023

Related U.S. Application Data

(63) Continuation of application No. PCT/EP2020/054090, filed on Feb. 17, 2020.

(51) Int. Cl.
*H04L 41/14* (2022.01)
*H04L 43/04* (2022.01)

(52) U.S. Cl.
CPC .............. *H04L 41/14* (2013.01); *H04L 43/04* (2013.01)

(58) Field of Classification Search
CPC ........ H04L 41/14; H04L 43/04; H04W 24/02; H04W 24/04
See application file for complete search history.

(56) References Cited

U.S. PATENT DOCUMENTS 6,553,366 B1 4/2003 Miller et al.
8,260,929 B2 9/2012 Pikovsky et al.
(Continued)

FOREIGN PATENT DOCUMENTS

WO 2019158737 A1 8/2019
WO 2019219173 A1 11/2019
WO 2020030277 A1 2/2020

OTHER PUBLICATIONS

"A solution to provide the available analytic information metadata," SA WG2 Meeting #128, Vilnius, Lithuania, S2-186724, pp. 1-3, 3rd Generation Partnership Project, Valbonne, France (Jul. 2-6, 2018).
(Continued)

*Primary Examiner* — Gil H. Lee
(74) *Attorney, Agent, or Firm* — Leydig, Voit & Mayer, Ltd.

(57) ABSTRACT

The present disclosure relates to the generation of analytics in a mobile network. The disclosure is concerned with tracing and exposing data information, which is used for generating analytics outputs to enable examination of the analytics outputs. The disclosure provides network entities and methods, which support the analytics generation and examination thereof, respectively. For instance, a first network entity for analytics generation is configured to receive, from a second network entity, a request for providing analytics information associated with at least one generated analytics output. Further, the first network entity is configured to provide the analytics information to the second network entity, wherein the analytics information comprises data information used to generate the at least one generated analytics output, wherein the data information comprises reference to data or data itself.

20 Claims, 9 Drawing Sheets

Table 1: Example of an analytics service

| Service name | | Generic analytics service |
|---|---|---|
| External visibility | | CONDITIONAL (see note 1) |
| Service capabilities | Manage subscriptions (O) | Manage (create, read, update, delete, list) subscriptions to analysis results generated by this particular analytics service. Filters may be specified. |
| | Configure analytics (O) | Configure how analysis results are derived. |
| | Provide analysis results (C) | Provide notifications with analysis results. This capability is applicable to services which generate analysis results asynchronously (see note 2). The result shall be uniquely identifiable. |
| | Request data used for result X (M) — 201 | Request the data that was used for a previous recommendation ( way of identification of the result shall be provided) |
| | Request analysis result (C) | Trigger an analytics process and obtain the result. This capability is applicable to services that need an explicit trigger to start (see note 2). The result shall be uniquely identifiable |
| NOTE 1: It depends on the actual analytics service whether the external visibility of this service is MANDATORY or OPTIONAL. | | |
| NOTE 2: At least one of these capabilities shall be supported | | |

(56) References Cited

U.S. PATENT DOCUMENTS

| | | | |
|---|---|---|---|
| 9,098,617 | B1 | 8/2015 | Pauley, Jr. et al. |
| 9,369,474 | B2 | 6/2016 | Lords et al. |
| 2009/0248722 | A1 | 10/2009 | Pikovsky et al. |
| 2012/0215779 | A1 | 8/2012 | Lipstone |
| 2017/0116426 | A1* | 4/2017 | Pattabhiraman ...... H04L 63/102 |
| 2017/0316052 | A1 | 11/2017 | Marin et al. |
| 2019/0356558 | A1* | 11/2019 | Han .................. H04L 41/14 |
| 2019/0391985 | A1* | 12/2019 | Vashist ............... G06F 40/40 |
| 2020/0112921 | A1* | 4/2020 | Han .................. H04W 76/27 |
| 2021/0014141 | A1* | 1/2021 | Patil ................. H04L 41/5009 |

OTHER PUBLICATIONS

"Proposed New SID on Enablers for Network Automation for 5G—Phase 2," 3GPP TSG-SA WG2 Meeting #133, Reno, USA, S2-1906722, Total 4 pages, 3rd Generation Partnership Project, Valbonne, France (May 13-17, 2019).

"Zero-touch network and Service Management (ZSM); Reference Architecture," ETSI GS ZSM 002 V1.1.1, pp. 1-80, European Telecommunications Standards Institute (ETSI), Sophia Antipolis Cedex, France (Aug. 2019).

"3rd Generation Partnership Project; Technical Specification Group Services and System Aspects; Study on non-file-based trace reporting; (Release 16)," 3GPP TR 28.806 V16.1.0, pp. 1-28, 3rd Generation Partnership Project, Valbonne, France (Dec. 2019).

"3rd Generation Partnership Project; Technical Specification Group Services and System Aspects; System architecture for the 5G System (5GS); Stage 2 (Release 16)," 3GPP TS 23.501 V16.3.0, pp. 1-417, 3rd Generation Partnership Project, Valbonne, France (Dec. 2019).

"3rd Generation Partnership Project; Technical Specification Group Services and System Aspects; Architecture enhancements for 5G System (5GS) to support network data analytics services (Release 16)," 3GPP TS 23.288 V16.2.0, pp. 1-57, 3rd Generation Partnership Project, Valbonne, France (Dec. 2019).

* cited by examiner

Table 1: Example of an analytics service

| Service name | | Generic analytics service |
|---|---|---|
| External visibility | | CONDITIONAL (see note 1) |
| Service capabilities | Manage subscriptions (O) | Manage (create, read, update, delete, list) subscriptions to analysis results generated by this particular analytics service. Filters may be specified. |
| | Configure analytics (O) | Configure how analysis results are derived. |
| | Provide analysis results (C) | Provide notifications with analysis results. This capability is applicable to services which generate analysis results asynchronously (see note 2). The result shall be uniquely identifiable |
| | Request data used for result X (M) ~201 | Request the data that was used for a previous recommendation (way of identification of the result shall be provided) |
| | Request analysis result (C) | Trigger an analytics process and obtain the result. This capability is applicable to services that need an explicit trigger to start (see note 2). The result shall be uniquely identifiable |
| NOTE 1: | It depends on the actual analytics service whether the external visibility of this service is MANDATORY or OPTIONAL. | |
| NOTE 2: | At least one of these capabilities shall be supported. | |

FIG. 4

Table 2: Dataset for tracing data used for a generated analytics output

| Data Set | Information | | Data Key | Data Sub Key |
|---|---|---|---|---|
| Analytics Data Trace | Analytics Data Trace identification | | UUID or Analytics Trace Correlation | Storage Address and/or NF service ID and/or NF ID |
| | NWDAF identification | | NWDAF NF ID | |
| | Analytics Identification | | Analytics ID | |
| | For each Analytics ID | | | |
| | Notification/Response identification | | Notification Correlation Information | |
| | For each notification/response (Data Trace Information) | | | |
| | Data trace identification | | UUID or Data Trace Correlation | |
| | (List of) Analytics consumer | | Notification Target Address and/or NF ID and/or OAM identification | |
| | Timestamp of consumption | | : | : |
| | Input Data Type | | Event ID, or Management Resource identification | |
| | For each Input Data Type | | | |
| | Source data type | | Service provider ID | NF ID and/or OAM identification |
| | For each Collected Data Sample from Source | | | |
| | Identification of data sample | | Event ID and/or Subscription Correlation ID and/or Notification Correlation Information and/or OAM identification of data | |
| | Temporal description of collected data | | : | : |
| | Data manipulation techniques | | : | : |

FIG. 6

Table 3: NWDAF service enhancements

| NWDAF service | Service Operation | Description | Enhanced Inputs Fields, Required | Enhanced Input Fields, Optional | Enhanced Outputs Fields, Required | Enhanced Output Fields, Optional |
|---|---|---|---|---|---|---|
| Nnwdaf_AnalyticsSubscription (Extensions to existing service) | Subscribe | The NF consumer indicates where the tracing of the data samples is required | None (same as defined in TS 23.288) | Indication of need for tracing | None (same as defined in TS 23.288) | None (same as defined in TS 23.288) |
| | Notify | If Option 1: the NF consumer is notified, and the notification includes data key for the analytics data trace | If Option 1: data key for analytics data trace. If Option 2: None | None (same as defined in TS 23.288). If Option 2: None | None (same as defined in TS 23.288). If Option 2: None | None (same as defined in TS 23.288). If Option 2: None |
| Nnwdaf_AnalyticsDataTrace (NEW service) | Query (Option 1) | The NF consumer indicates the need to retrieve the analytics data trace | Analytics Data Trace identification | List of Data trace identification | List of Analytics Data Trace(s) or Reference for Entity storing the list of Analytics Data Trace(s) | None |
| | Query (Option 2) | | Analytics ID, Subscription Correlation ID, Notification Target Address | Notification Correlation ID | | |
| | List | Allow a consumer to obtain a list of analytics data traces | Analytics ID | Consumer ID, and/or NWDAF ID and/or Notification Correlation ID | List of Analytics Data Trace identification(s) or list of Data trace identification | Analytics Data Trace(s) or Reference for Entity storing the list of Analytics Data Trace(s) |

FIG. 7

TRACING AND EXPOSING DATA USED FOR GENERATING ANALYTICS

CROSS-REFERENCE TO RELATED APPLICATIONS

This application is a continuation of International Application No. PCT/EP2020/054090, filed on Feb. 17, 2020, the disclosure of which is hereby incorporated by reference in its entirety.

FIELD

The present disclosure relates to the generation of analytics in a mobile network. The present disclosure is specifically concerned with tracing and exposing data, which is used for generating analytics outputs, in order to allow examination of the analytics outputs. To this end, the disclosure proposes network entities and corresponding methods, which respectively support the analytics generation and the examination of the generated analytics.

BACKGROUND

The next generation of mobile and wireless communications, for example, 5G or beyond, has been defined taking into consideration high levels of automation, both in the management plane (see, e.g., ETSI Group Specification (GS): Zero-touch network and Service Management (ZSM): Reference Architecture (i.e., ETSI GS ZSM002 V1.1.1 (2019-08)), as well as in the control plane (see, e.g., TS 23.288). One key component of such automation is an analytic/learning/artificial intelligence (AI) service.

In the present disclosure, the term "analytics service" is generically used to capture all of these services. In the mobile networks management plane (e.g., the management data analytic service (MDAS)) or the control plane (e.g., the network data analytics function (NWDAF)), entities that provide intelligence and support the automation of the system are defined.

Network operator may want to track and examine, why a certain analytics service produced a particular analytics output—e.g., why it made a particular recommendation that was consumed by some entity, or why it derived a particular insight in the network. Without the ability to understand the analytics outputs, the operators does not have the capacity to identify the behavior of the analytics service and/or to debug errors in the behavior of the analytics service.

Currently, there is no satisfying way for an operator to debug or examine an analytics service, and there is no known solution to this problem.

SUMMARY

Embodiments of the present disclosure are based on the insight that it is currently not possible, e.g., for the operator, to track a relationship between an analytics output generated by an analytics service and data used by the analytics service to generate the analytics output.

In view of the above-mentioned problems and disadvantages, the embodiments of the disclosure improve analytics services. For example, aspects of the present disclosure enable examining and debugging an analytics service. In particular, insight into the relationship between a generated analytics output of the analytics service and data used for generating the analytics output is allowed due to aspects of the present disclosure. For instance, aspects of the present disclosure enable the operator to obtain this relationships to have the possibility to examine and debug the analytics service. To this end, embodiments of the disclosure provide entities, and new interfaces and signaling between these entities.

A first aspect of this disclosure provides a first network entity for analytics generation of a mobile network, the first network entity being configured to: receive, from a second network entity, a request for providing analytics information associated with at least one generated analytics output; and provide the analytics information to the second network entity, wherein the analytics information comprises data information used to generate the at least one generated analytics output, wherein the data information comprises reference to data or data itself.

The term "analytics generation" means that the first network entity may generally be configured to provide an analytics service, specifically to generate one or more analytics outputs. Each analytics output may include a recommendation and/or an insight. The analytics outputs for the analytics service may be generated by one or more analytics functions (e.g., NWDAF or MDAS) implemented by the first network entity.

By providing the analytics information, which includes the data information, examination and debugging of the analytics outputs, the analytics service is enabled. In particular, the second network entity may obtain knowledge about the relationship between each particular analytics output and the data used for generating that particular analytics output. By being able to obtain this data, a consumer of the analytics outputs can, for example, verify a desired or undesired functioning of the analytics service. The capability of the first network entity to correlated data and analytics output, and provide accordingly the analytics information including the data information, is referred to as "tracing capability".

In an implementation of the first aspect, the request for providing analytics information associated with the at least one generated analytics output includes an identification information for identifying the at least one generated analytics output.

Accordingly, the second network entity can identify each particular analytics output, for instance, in a case where the analytics service provided by the first network entity outputs different analytics outputs. Further, the first network entity can provide the correct analytics information in response to a request from the second network entity including the identification information of one or more particular analytics outputs.

The identification information for identifying the at least one generated analytics output may comprise a timestamp, and/or may comprise an identifier, and/or may comprise a set of filters used in a service operation.

In an implementation of the first aspect, the analytics information further comprises an identification information for identifying the data information.

Accordingly, the first network entity may be configured to mark the data information relating to the data that was used to generate a particular analytics output. For example, the data information may be marked with an identifier of the analytics output. The data information may be provided on request to whoever wants to consume this information.

In an implementation of the first aspect, the first network entity is further configured to receive an activation request for tracing the data information used to generate the at least one generated analytics output; and trace the data information upon receiving the activation request.

"Tracing the data information" means that the first network entity is configured to determine and/or maintain knowledge, about which data was, is, or will be used for generating a particular analytics output. The first network entity can then provide the analytics information associated with that particular analytics output, wherein the analytics information includes the data information indicating the data that was, is, or will be used for generating that particular analytics output.

In an implementation of the first aspect, the first network entity is further configured to maintain mapping information comprising one or more entries, each entry being related to a generated analytics output, wherein each entry comprises an identification information associated with the respective generated analytics output, and comprises the data information used for generating the respective generated analytics output.

Thus, the first network entity is configured to track the data used for generating each particular analytics output, and to maintain a relationship of that data and the analytics output. A consumer of this tracing capability may be the operator, or may be a management or control plane service or function, or may be an external entity such as a network entity for analytics generation of another mobile network.

In an implementation of the first aspect, each entry further comprises at least one of: an identifier of a network entity for analytics generation of a mobile network, which network entity is used for generating the respective generated analytics output: a list of network entities consuming the respective generated analytics output: a type of the data information used for generating the respective generated analytics output.

The identifier of a network entity for analytics generation of a mobile network, which network entity is used for generating the respective generated analytics output, may be an identifier of the first network entity. It is also possible that the first network entity maintains the mapping information, which is (also) related to one or more other network entities for analytics generation.

In an implementation of the first aspect, the mapping information further includes, for each data information, at least one of: an identifier of the data information: a source of the data information: time information related to the data information: a manipulation technique applied to the data information.

In an implementation of the first aspect, the first network entity is a control plane entity, in particular comprising a network data analytics function (NWDAF) or the first network entity is a management plane entity, in particular, comprising a management data analytics service (MDAS).

The management plane entity may also be an implementation of an analytics service in ETSI GS ZSM002 V1.1.1 (2019-08).

A second aspect of this disclosure provides a second network entity for examining analytics generation of a mobile network, the second network entity being configured to: provide a request for analytics information associated with at least one generated analytics output to a first network entity for analytics generation; and receive the analytics information from the first network entity, wherein the analytics information comprises data information used to generate the at least one generated analytics output, wherein the data information comprises reference to data or data itself.

The second network entity may be a consumer of an analytic service provided by the first network entity. Accordingly, the second network entity may be configured to receive one or more analytics outputs generated by the first network entity, for instance, upon request. The second network entity is configured to obtain the data information associated with a particular analytics output, and can thus examine the received analytics output and/or in general the analytics service. For instance, the data information may allow the second network entity to debug the analytics service. Notably, the second network entity may receive the analytics information together with an associated analytics output. However, the second network entity can also request analytics information after an associated analytics output was received. The second network entity can also request the analytics information associated with an analytics output that was received by another entity. That is, the second network entity does not necessarily have to be the consumer of the analytics output.

In an implementation of the second aspect, the second network entity is configured to: provide an activation request for tracing the data information used to generate the at least one generated analytics output.

In this way, the second network entity may be configured to activate a service at the first network entity, which activated service can then provide the analytics information including the data information to the second network entity or to another entity.

In an implementation of the second aspect, the request for providing analytics information associated with the at least one generated analytics output includes an identification information for identifying the at least one generated analytics output.

The identification information for identifying the at least one generated analytics output may comprise a timestamp, and/or may comprise an identifier, and/or may comprise a set of filters used in a service operation.

In an implementation of the second aspect, the analytics information further comprises an identification information for identifying the data information.

In an implementation of the second aspect, the data information comprises reference to data, and the second network entity is further configured to: send the analytics information including the data information to a third network entity; and receive the data, which is referenced by the reference to data in the data information, from the third network entity.

The third network entity may be a Data Lake entity, as described in the detailed description of embodiments.

In an implementation of the second aspect, the second network entity is a network function (NF), an application function (AF), or an operations, administration and management (OAM) function.

A third aspect of this disclosure provides a method for analytics generation of a mobile network, the method comprising: receiving a request for providing analytics information associated with at least one generated analytics output; and providing the analytics information, wherein the analytics information comprises data information used to generate the at least one generated analytics output, wherein the data information comprises reference to data or data itself.

In an implementation of the third aspect, the request for providing analytics information associated with the at least one generated analytics output includes an identification information for identifying the at least one generated analytics output.

In an implementation of the third aspect, the analytics information further comprises an identification information for identifying the data information.

In an implementation of the third aspect, the method further comprises receiving an activation request for tracing the data information used to generate the at least one generated analytics output; and tracing the data information upon receiving the activation request.

In an implementation of the third aspect, the method further comprises maintaining mapping information comprising one or more entries, each entry being related to a generated analytics output, wherein each entry comprises an identification information associated with the respective generated analytics output, and comprises the data information used for generating the respective generated analytics output.

In an implementation of the third aspect, each entry further comprises at least one of: an identifier of a network entity for analytics generation of a mobile network, which network entity is used for generating the respective generated analytics output: a list of network entities consuming the respective generated analytics output: a type of the data information used for generating the respective generated analytics output.

In an implementation of the third aspect, the mapping information further includes, for each data information, at least one of: an identifier of the data information; a source of the data information: time information related to the data information: a manipulation technique applied to the data information.

In an implementation of the third aspect, the method is performed by a control plane entity, in particular by a NWDAF, or is performed by a management plane entity, in particular, by a MDAS.

The method of the third aspect achieves the same advantages as the first network entity of the first aspect.

A fourth aspect of this disclosure provides a method for examining analytics generation of a mobile network, the method comprising: providing a request for analytics information associated with at least one generated analytics output; and receiving the analytics information, wherein the analytics information comprises data information used to generate the at least one generated analytics output, wherein the data information comprises reference to data or data itself.

In an implementation of the fourth aspect, the method comprises providing an activation request for tracing the data information used to generate the at least one generated analytics output.

In an implementation of the fourth aspect, the request for providing analytics information associated with the at least one generated analytics output includes an identification information for identifying the at least one generated analytics output.

In an implementation of the fourth aspect, the analytics information further comprises an identification information for identifying the data information.

In an implementation of the fourth aspect, the data information comprises reference to data, and the second network entity is further configured to: send the analytics information including the data information to a third network entity; and receive the data, which is referenced by the reference to data in the data information, from the third network entity.

In an implementation of the fourth aspect, the method is performed by NF, or an AF, or an OAM function.

The method of the fourth aspect achieves the same advantages as the second network entity of the second aspect.

A fifth aspect of this disclosure provides a computer program comprising a program code for performing the method according to the third or fourth aspect or any of its implementations, when executed on a computer.

A sixth aspect of this disclosure provides a non-transitory storage medium storing executable program code which, when executed by a processor, causes the method according to the third or fourth aspect or any of its implementations to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementations will be explained in the following description of exemplary embodiments in relation to the enclosed drawings, in which

FIG. 4 shows an example of a second network entity according to an embodiment of the disclosure, requesting analytics information from a first network entity according to an embodiment of the disclosure.

FIG. 6 shows a second exemplary usage option of an NWDAF as a first network entity according to an embodiment of the disclosure.

FIG. 7 shows an implementation of the NWDAF service extensions/enhancements.

DETAILED DESCRIPTION

Figure 1:
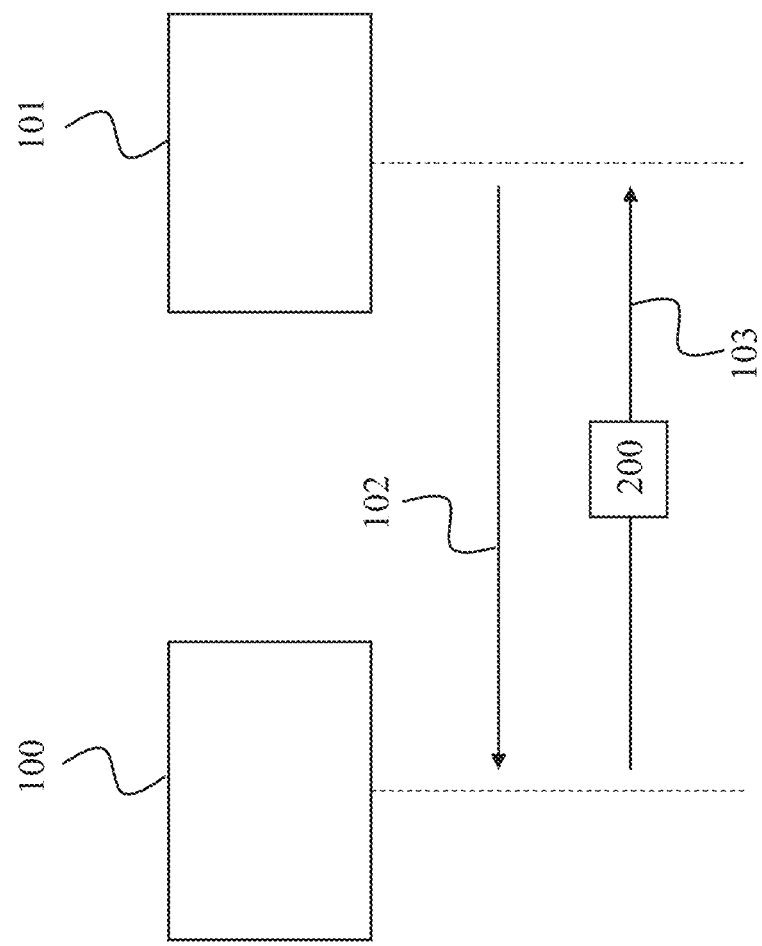
FIG. 1 shows a first network entity and a second network entity, according to embodiments of the disclosure, interacting with each other.

FIG. 1 shows a first network entity 100 and a second network entity 101, according to embodiments of the disclosure, interacting with each other. The first network entity 100 is suitable for analytics generation of a mobile network, and the second network entity 101 is suitable for examining the analytics generation. The second network entity 101 may, or may not be, a consumer of the analytics. The analytics may be provided as an analytics service by the first network entity 100, in the form of one or more analytics outputs.

The second network entity 101 is configured to provide, to the first network entity 100, a request 102 for analytics information 103 associated with one or more generated analytics outputs. Accordingly, the first network entity 100 is configured to receive the request 102 provided by the second network entity 101.

Further, the first network entity 100 is configured to provide the analytics information 103 to the second network entity 101. The analytics information 103 comprises data information 200 used to generate the one or more generated analytics outputs 201 (see FIG. 2), wherein the data information 200 comprises reference to data 202 (see FIG. 2) or comprises data 202 itself. The analytics information 103 may comprise the data 202 used to generate the one or more analytics outputs 201, or may comprise reference to the data 202 used to generate the one or more analytics outputs 201.

The reference to the data 202 comprises information that allows obtaining the data 202. For instance, the reference may comprise a pointer to the data 202, or a link to the data 202, or time stamp of receiving the data 202 etc. The reference may also indicate a storage location where the data 202 is stored, or may comprises information about the entity storing the data 202. Accordingly, the second network entity 101 is configured to receive the analytics information 103 from the first network entity 100.

In this way, the second network entity 101 may, for each analytics output, become aware of the data 202 that was used for generating that analytics output 201.

The first network entity 100 and/or the second network entity 101 may be able to uniquely identify each individual analytics output 201. The first network entity 100 may be able to map each uniquely identified generated analytics output 201 to the data 202 used for generating the analytics output 201.

For example, for each piece of data 202 used for generating a given uniquely identified generated analytics output 201, the first network entity 100 may keep a mapping of one or more of:
  identification information of collected data 202;
  identification information of a source of the collected data 202;
  a temporal description of the collected data 202 (e.g., an interval of time of collected data sample);
  one or more manipulation techniques (e.g., which kind of filtering, aggregation, classification, selection mechanism) applied to the collected data 202.

The first network entity 100 may provide a service that may, e.g., upon request by the second network entity 101, provide the data information 200 relating to the data 202 used for each individual analytics output 201. A mapping among multiple consumers of the uniquely identified generated analytics output 201 is also possible.

The first network entity 100 and/or the second network entity 101 may comprise a processor or processing circuitry (not shown) configured to perform, conduct or initiate the various operations of the first network entity 100 and/or second network entity 101 described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

The first network entity 100 and/or second network entity 101 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the first network entity 100 and/or second network entity 101 to be performed.

In one embodiment, the processing circuitry comprises one or more processors and a non-transitory memory connected to the one or more processors. The non-transitory memory may carry executable program code which, when executed by the one or more processors, causes the first network entity 100 and/or second network entity 101 to perform, conduct or initiate the operations or methods described herein.

In particular, the first network entity 101 and the second network entity 101 may perform methods according to embodiments of the disclosure. In particular, the first network entity 100 may perform—as shown in FIG. 1—a method for analytics generation according to the third aspect described in the summary part, and the second network entity 101 may perform —as shown in FIG. 1—a method for examining analytics generation of a mobile network according to the fourth aspect described in the summary part.

Figure 2:
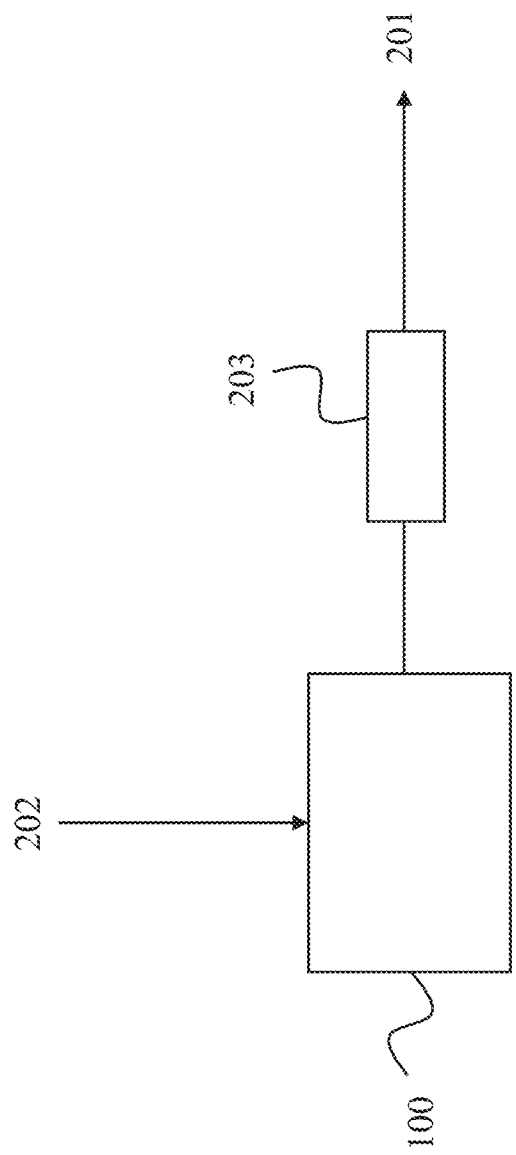
FIG. 2 shows a first network entity according to an embodiment of the disclosure.

FIG. 2 shows the first network entity according to an embodiment of the disclosure, which builds on the embodiment shown in FIG. 1. In particular, FIG. 2 shows that the first network entity 100 may be configured to provide an analytics output 201, wherein the analytics output 201 is generated based on certain data 202.

The first network entity 100 can further provide the analytics information 103 associated to the analytics output 201 (as shown in FIG. 1), wherein the provided analytics information 103 comprises the data information 200 related to the data 202 used for generating the analytics output 201 (as mentioned above, the data information 200 may comprise or be the data 202, or may reference to the data 202).

To this end, the analytics output 201 may be provided with an identification information 203, so that the second network entity 101 can request the data information 200 for the particular analytics output 202 as identified by this identification information 203.

In fact, two options of the first network entity 100 can be described with respect to FIG. 2. The difference between these two options is in the way the analytics output 201 is identified: in the first option, the analytics output 201 may be identified with a timestamp, or with other information 203 (but not an extra identifier) that uniquely identifies the analytics output 201.

In the second option, the analytics output 202 may be identified with an identifier 203 that is uniquely associated with that analytics output 201. Note that these ways of identifying the analytics output 201 are only examples, and other ways could be used.

To support the above-described tracing capability of the first network entity 100, which allows providing the appropriate analytics information 103 including the data information 200 associated with an analytics output 201, the first network entity 100 may be further configured to somehow mark the data 202 used to derive the analytics output 201. In an example, this marking could be realized by crating and/or maintaining mapping information 300 (e.g., a mapping table) as shown in FIG. 3.

For instance, in a mobile network, like a 5G network, both the control plane and the management plane may store the data 202 in various memories or databases. This data 202 may be fed to one or more analytics functions—as for instance implemented by the first network entity 100 to provide the analytics service—wherein the analytics functions can derive one or more analytics outputs 201, e.g., possible insights and/or recommendations, based on this data 202.

The first network entity 100 may maintain the mapping information 300. The mapping information 300 may comprise one or more entries 301, wherein each entry 301 may be related to a generated analytics output 201, and wherein each entry 301 may comprise an identification information 203 associated with the respective generated analytics output 201. Further, each entry 301 may comprises data information 200 about the data 202, which is or was used for generating the respective generated analytics output 201.

Figure 3:
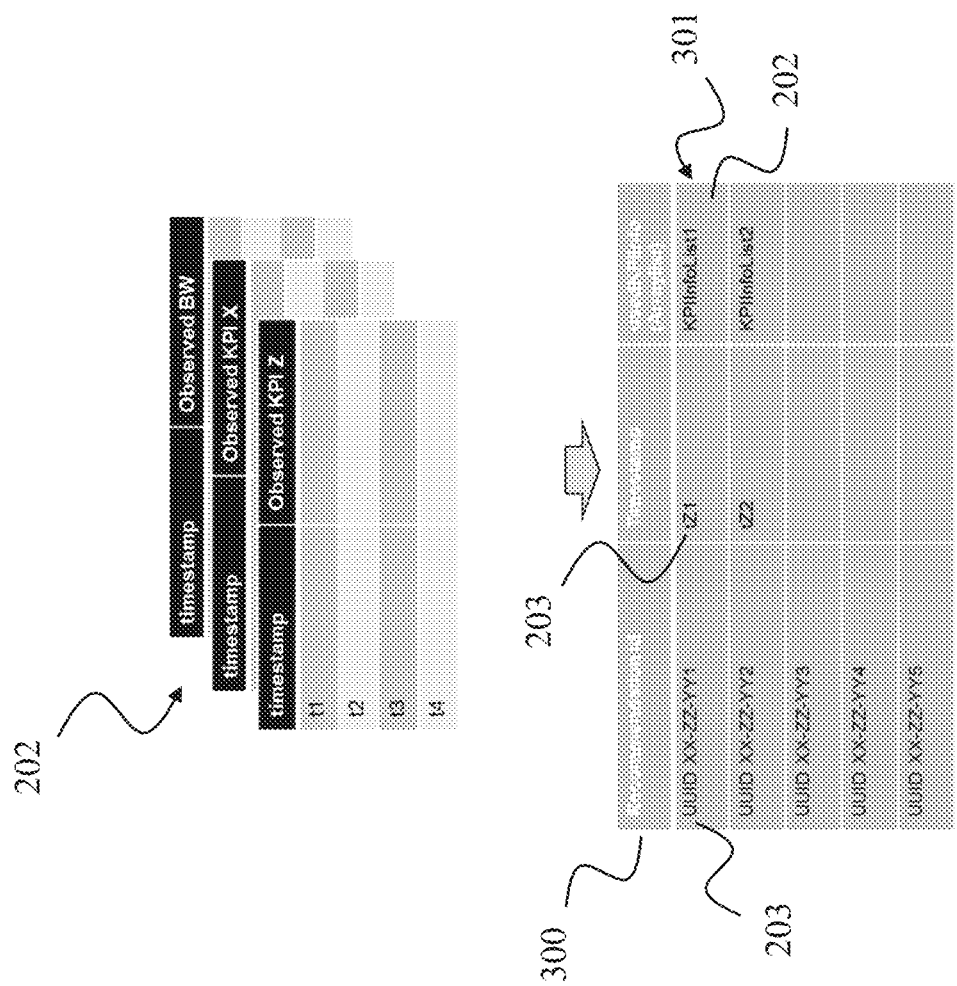
FIG. 3 shows mapping information maintained by a first network entity according to an embodiment of the disclosure.

In FIG. 3, the mapping information 300 is exemplarily realized using a data structure called "KPI-Info-List per recommendation ID" (e.g., the data 202 is maintained in the data structure per analytics output 201, wherein a list of the data 202 is referred to as the "KPI-Info-List" and the analytics output 201 is exemplarily referred to as "recommendation").

Note that the recommendation ID refers to the second option described above, e.g., it refers to an identifier of the analytics output 201. In the first option described above, for instance, the entire row (in the table shown in FIG. 3 representing the data structure) related to the analytics output 201 could serve for identifying the analytics output 201.

In addition to identifying the analytics output 201, the KPI-Info-List may store a list of so-called "KPI-info objects", e.g., pieces of data 202 used for generating this analytics output 201.

Assuming the data 202 is composed of values of various key performance indicators (KPIs) with their respective timestamps, the KPI-Info object may just record the initial timestamp and the final timestamp, together with every KPI identifier, and optionally together with the location of the database where it is stored.

Upon receiving the request 102 (e.g., a request get-DataForRecommendation) from the second network entity 101 for analytics information 103, the first network entity 100 may simply fetch the KPI-Info-List from that database according to the mapping information 300, and may provide a link (reference) to the data 202 as data information 200, as well as the timestamps of the data 202 used for generating the analytics output 201.

Alternatively, the first network entity 100 may fetch the entire data 202 itself, and may then provide the data 202 to the second network entity 101 as the data information 200.

In the following, exemplary implementations based on the first network entity 100 and the second network entity 101, according to embodiments of the disclosure, will be described.

Figure 5:
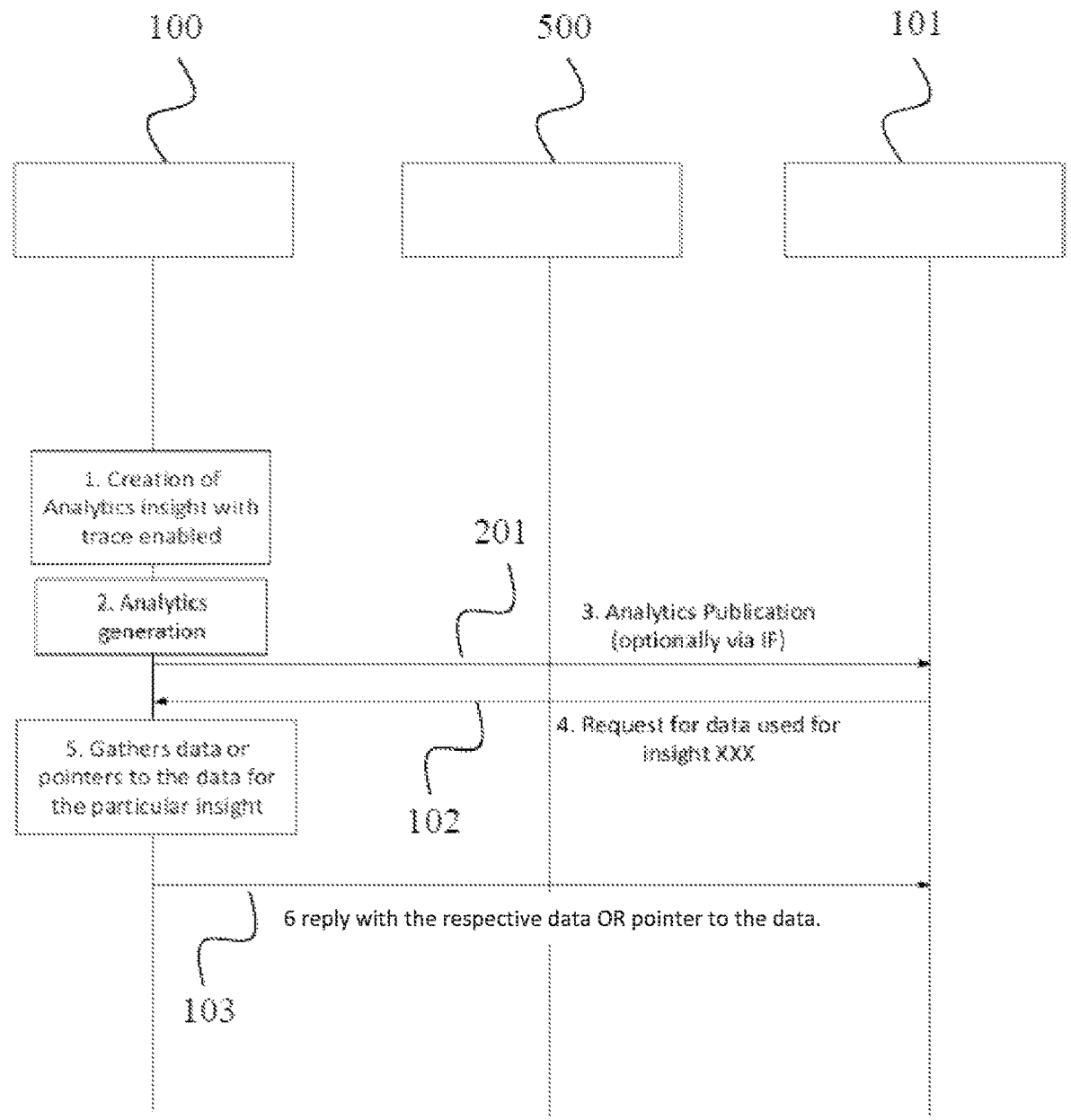
FIG. 5 shows a first exemplary usage option of an NWDAF as a first network entity according to an embodiment of the disclosure.

FIG. 4 and FIG. 5 relate to an embodiment for end-to-end (E2E) management to support the above described tracing capability.

FIG. 4 shows a Table 1, which illustrates a generic analytics service, exemplarily in ETSI GS ZSM002 V1.1.1 (2019-08). The tracing capability enables to request 102 analytics information 103, including data information 200 about data 202 that was used to generate an analytics output 201 (in Table 1 the analytics output 201 is referred to as "result X (M)", wherein the "M "proposes that this is a mandatory capability of the analytics service).

The procedure in FIG. 5 shows how the tracing capability of the first network entity 100 can be used by the second network entity 101 (here the second network entity 101 is also the consumer of the analytics service provided by the first network entity 100).

FIG. 5 shows in particular the exemplary analytics service shown in Table 1 in FIG. 4. An integration fabric 500 may be arranged between the first network entity 100 and the second network entity 101. The integration fabric 500 may be an optional communication medium configured to transfer messages between the first network entity 100 (providing the analytics service) and the second network entity 101 (consuming the analytics service). A consumer of the analytics service could also be any other software/hardware entity, a managed entity, or a person.

The following steps present an example of the use of the tracing capability that can be used by the second network entity 101.

The analytics function/service of the first network entity 100 is in normal processing, e.g., producing one or more analytics outputs 201 with the tracing capability enabled. This means that any generated analytics output 201 provided by the first network entity will have the tracing option enabled. Alternatively, the second network entity 101 could selectively enable tracing only for some generated analytics outputs 201.

2/3. The analytics output 201 is generated published to the subscribed consumer(s) (here including the second network entity 101), or to the integration fabric 500 which may relay it to the consumer(s). Alternatively the second network entity 101 could request a particular analytics output 201.

4. In step 4 at least one of the analytics consumer(s) (here the second network entity 101) would like to inspect the data 202 used for generating an analytics output 201, which is identified with "XXX" as the identification information 203. "XXX" may denote any mechanism usable to identify the analytics output 201, such as a universally unique identifier (UUID) or a timestamp. Thus, it sends the request 103 indicating the identification information 203 to the first network entity 101. Note that the request 102 for the analytics information 103 (i.e., in effect for the data 202) could be for a set of analytics outputs 201, not just a single analytics output 201.

5/6. The tracing capability of the first network entity 101 may gather the respective data 202 (or pointers to the data 202), i.e., may obtain the data information 200, and may provide a reply including the analytics information 103 comprising the data information 200 to the second network entity 101.

For an embodiment in $3^{rd}$ generation partnership project (3GPP) SA5, a similar tracing capability can be implemented, thus allowing the management system (represented by the first network entity 100) to provide one or more consumer(s) (including, e.g., the second network entity 101) the data 202 that is used, for instance, by the MDAS for generating one or more analytics outputs 201.

FIG. 6 to FIG. 9 relate to an implementation for a control plane analytics service, which is able to expose a relationship between a generated analytics output 201 (related to an analytics ID) and data (samples) used for generating the analytics output 201 (e.g., 3GPP SA2 based).

In this implementation, the analytics service is mapped to services provided by the NWDAF (as defined in 3GPP TS 23.501 and detailed in 3GPP TS 23.288). The first network entity 100 may comprise the NWDAF. In this case, there are two alternative implementations:

Option 1: Two changes are introduced in the NWDAF services.

First, the output parameters of the NWDAF services providing an analytics output 201 (for an analytics ID), e.g., Nnwdaf_AnalyticsSubscription_Notify and Nnwdaf_AnalyticsInfo_response, are extended with a new parameter, which uniquely identifies the mapping between the analytics output 201 and the data 202 that is used by the NWDAF 100 (e.g., by a machine learning (ML) engine, analytics model, big data inference engine, etc.).

Second, a new service dedicated to provide the analytics information 103, which comprises the data information 200 about the data 202 (i.e., a reference to the data 202 or the data 202 itself) used for a given analytics output 201 generated by the NWDAF 100, upon a received request 102. The request 102 may contain the unique identifier of the mapping of the analytics output 201 to the data 202 used for the analytics output generation.

Option 2: Only a single change in the NWDAF services.

Introduction of a new service in the NWDAF 100, which is able to provide the analytics information 103, which comprises the data information 200 about the data 202 used for a given analytics output 201 generated by the NWDAF 100, upon receiving a request 102. The request 102 may contain a set of fields that uniquely identifies the analytics output 201, and/or the analytics ID for which the analytics output 201 is provided, and/or the specific analytics output instance. For example, if multiple analytics outputs 201 for the same analytics ID are generated, each of these analytics outputs 201 is an analytics output instance. Further, the request 102 may contain an identification information of the consumer (e.g., and ID of the second network entity 101) of the analytics output 201.

Table 2 in FIG. 6 shows a dataset representing an implementation for mapping information 300 between a generated analytics output 201 and data 202 used for generating the analytics output 201.

Table 3 in FIG. 7 shows an implementation of the described NWDAF service extensions/enhancements. Although not represented in Table 3, the same extension of parameters are applicable to the NWDAF services, which are related to the request/response model.

The need for data tracing can be defined either statically, e.g., hard-coded at the NWDAF 100, or it could be indicated dynamically, e.g., via an analytics subscription parameter—as illustrated in Table 3.

Figure 8:
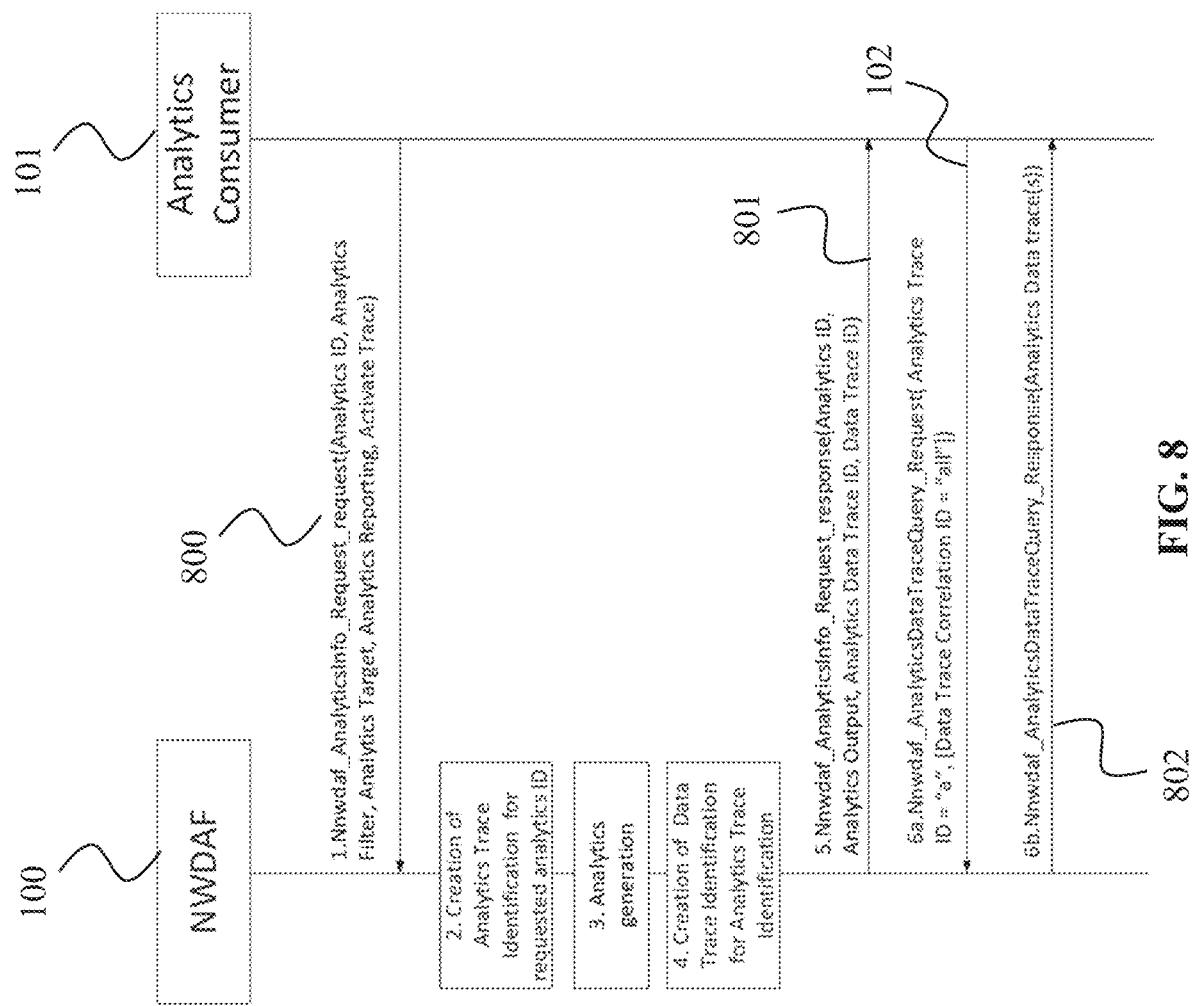
FIG. 8 shows the interactions between the first network entity and the second network entity.
Figure 9:
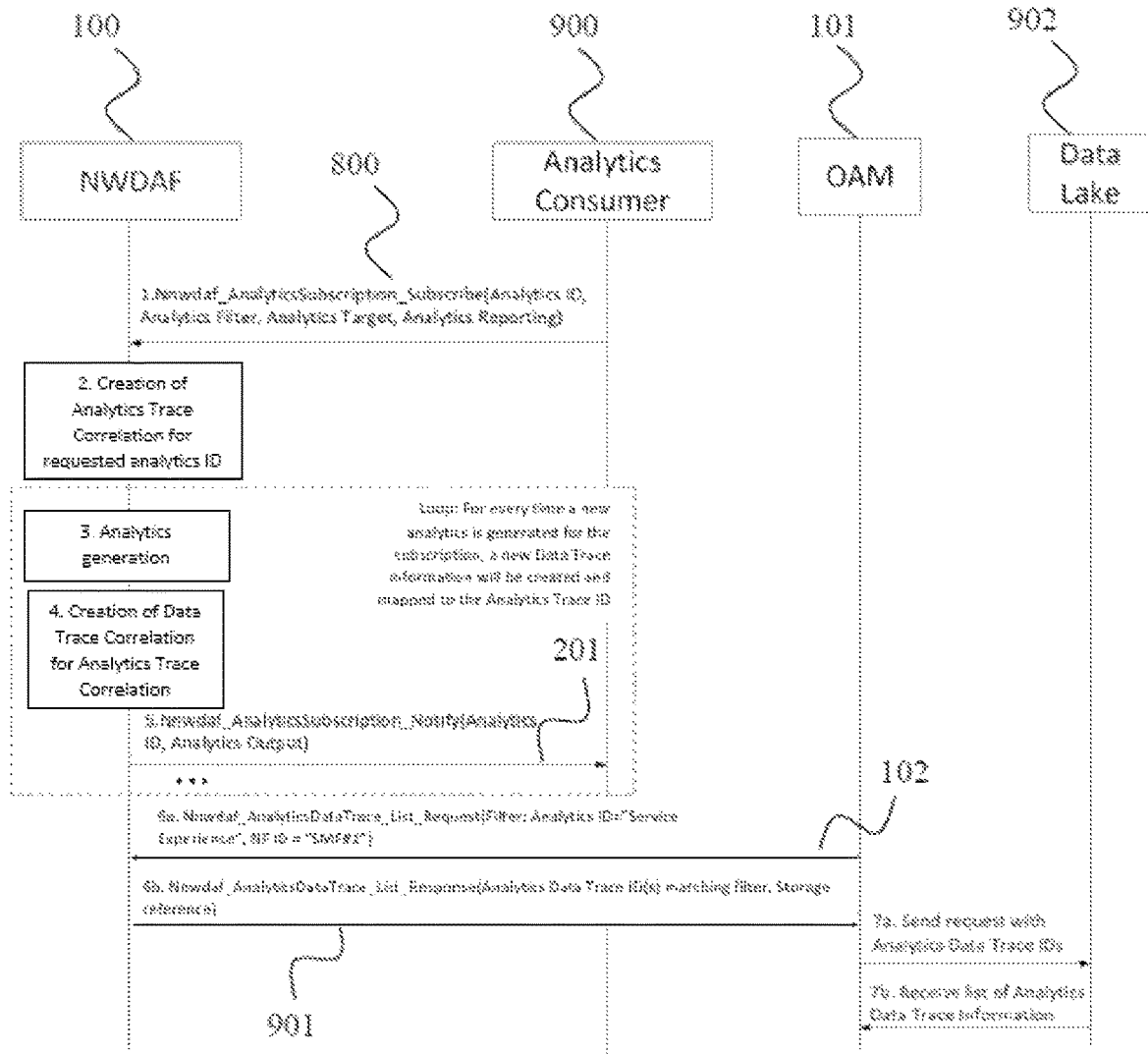
FIG. 9 shows the interactions the analytics consumer consumes analytics output(s) from the NWDAF, and the OAM examines the analytics generation.

The procedures shown in FIG. 8 and FIG. 9 are examples of how the services defined in Table 2 and Table 3 can be used, and examples of entities interacting with such services.

The interactions between the first network entity 100 (NWDAF) and the second network entity 101 (analytics consumer) shown in FIG. 8, consider an implementation where the analytics consumer explicitly indicates to the NWDAF 100—via a subscription/request 800—the need for tracing data 202 used for analytics output generation regarding one or more analytics outputs 201 (for one or more analytic IDs).

The analytics consumer 101 may particularly invoke the NWDAF service Nnwdaf_AnalyticsInfo_Request_request (with the existing parameters as defined in TS 23.288). In addition, this request 800 may also include a parameter called "Activate Trace" set to "true". The benefit of using this parameter is that the NWDAF 100 can obtain from the consumer 101 the indication, for which generated analytics output 201 the data 202 needs to be traced. The consumer 101 can accordingly use the request 800 as an activation request for tracing the data 202. If this parameter is not sent, in an alternative, it may be up to the internal logic of the NWDAF 100 to decide when and which generated analytics output 201 should be generated, or the NWDAF 100 may be configured to trace all generated analytics output 201. Further, the parameter in the request 800 can support a better resource usage of the NWDAF resources. Nevertheless, this parameter may also introduce a trade-off, as it also imposes that it is up to the consumer 101 to decide, which data 202 used for which analytics output generation will be actually traced.

Based on the received request 800 with the "Activate Trace" parameter set to true, the NWDAF 100 may create a new dataset called "Analytics Data Trace", and may define a unique identifier "Analytics Data Trace ID". This unique identifier can be either a UUID or an analytics data trace correlation identifier, which relates the request 800 of the analytics output 201 to the "Analytics Data Trace ID". For instance, the analytics trace correlation identifier can be a function of the subscriber identification and the analytics ID.

The NWDAF 100 performs the analytics output generation (e.g., the NWDAF 100) may calculate the analytics output 201 according to the requested "Analytics Target" and/or "Analytics Reporting" and/or "Analytics Filter" included in the request 800).

For the generated analytics output 201, the NWDAF 100 creates the dataset "Data Trace Information", and defines the unique identifier "Data Trace ID" for the "Data Trace Information". The "Data Trace Information" may be mapped and included as part of the "Analytics Data Trace" dataset for the "Analytics Data Trace ID" related to the generated analytics output 201. When creating the "Data Trace Information", the NWDAF 100 includes in this information all the fields defined in Table 2.

The NWDAF 100 sends a response 801 to the consumer 101 using the Nnwdaf_AnalyticsInfo_Request_response including the parameters as defined in TS 23.288, and in addition including the parameters "Analytics Data Trace ID", and "Data Trace ID". The first parameter is important for the consumer 101 to be able to query the NWDAF 100 to retrieve the actual information of the "Analytics Data Trace" for the analytics output 201 it consumed (or will consume in the future). The second parameter is important in the case of multiple analytics outputs 201 generated for the same analytics ID. In this case, the consumer 101 can also request only the "Data Trace Information" for an analytics output 201 it received, not needing to retrieve all the "Data Trace information" for all received analytics outputs 201.

The NWDAF 100 exposes the service Nnwdaf_AnalyticsDataTrace that can be invoked by the consumer 101 to retrieve—as respective implementation of the data information 200 comprised in the analytics information 103—either the records of the "Analytics Data Trace" for a given or all generated analytics outputs 201 (for one or more analytics IDs), and/or all or some records of the "Data Trace Information" for a given generated analytics output 201. This service exposes the operation for a query request (see step 6a), that produces a query response (see step 6b).

6a. The consumer 101 can invoke the Nnwdaf_AnalyticsDataTrace_Query_request service operation, in order to provide the request 102, with the parameters that can specify the target "Analytics Data Trace" dataset, which the consumer 101 wants to retrieve. FIG. 8 shows the example of a query operation with Option 1 (as described in Table 3). In this case, the consumer 101 indicates the identifier "Analytics Data Trace ID" of the "Analytics Data Trace" dataset it wants to retrieve, and optionally it also indicates one or more "Data Trace ID" related to the "Data Trace Information" that should be returned. These two parameters are used by the NWDAF 100 as filters, in order to select the data information 200 ("Analytics Data Trace" and/or "Data Trace Information") in the analytics information 103, to be retrieved and provided to the consumer 101. In the example, all "Data Trace Information" associated with the "Analytics Data Trace" according to the "Analytics Trace ID" may be returned.

6b. This implementation shows the option, in which the NWDAF 100 sends a response 802 to the request 101, and thus returns the actual "Analytics Data Trace" dataset, as the analytics information 103 including the data information 200, associated with the requested "Analytics Data Trace ID" (as per example, but if more "Analytics Data Trace" were indicated in the query request, the return would be a list of "Analytics Data Trace" datasets).

The interactions described in FIG. 9 consider the possible implementation where the following behaviors are enabled. In FIG. 9, the analytics consumer 900 consumes analytics output(s) 201 from the NWDAF (first network entity 100). However, the OAM (second network entity 101) may be suitable for examining the analytics generation.

The NWDAF 100 is configured to trigger the tracing of any analytics output 201 that is generated. In this case, the parameter "Activate Trace" is not required to be included (and set to "true") in the request 800 and/or subscription of the NWDAF services for analytics output generation. Eventually such "Activate Trace" parameter may be set to "false", in case the analytics consumer 101 of the NWDAF 100 explicitly decides that a data tracing for a requested analytics output 201 should not be performed by the NWDAF 100. If this is the case, none of the steps related to the creation and association of the "Analytics Data Trace" dataset and the "Data Trace Information" dataset, may be performed by the NWDAF 100.

In this implementation, the Option 2 mode of interaction as described in Table 3 is considered. In this case, there are no changes in parameters of the NWDAF services for notification and/or response on the generated analytics output 201. With this mode of operation, the difference is the type of parameters that are used for querying the analytics information 103 including the data information 200 via the Nnwdaf_AnalyticsDataTrace_Query_request operation (request 102). The OAM 101 as consumed of the NWDAF query service is not aware of the "Analytics Data Trace ID" nor of the "Data Trace ID". Therefore, there are two possibilities for the OAM 101 to retrieve the "Analytics Data Trace" and "Data Trace information" datasets (i.e., the data information 200 in the analytics information 103 for an analytics output 201):

Alternative 1 (with operation Option 2): The OAM 101 uses only the Nnwdaf_AnalyticsDataTrace_Query_request operation from the NWDAF 100, and uses as filter to request the analytics information 103 including the data information 200, information as indicated in Table 3 for Option 2. For instance, the request 102 may include the analytics ID (e.g., to support the identification of the "Analytics Data Trace ID") and/or correlation information (e.g., to support the identification of the "Data Trace ID").

Alternative 2 (with operation Option 2): The OAM 101 invokes the Nnwdaf_AnalyticsDataTrace_List_request operation from the NWDAF 100 and obtains in response a list of one or more "Analytics Trace ID" and/or a list of one or more "Data Trace ID". The OAM 101 can use as filter for this service operation, the fields listed in the Table 3, for instance, per type of analytics ID, or per NWDAF 100 that generated the analytics ID, or per analytics output 201, or per consumer of the analytics ID. This type of operation is useful when the consumer of the "Analytics Data Trace" (i.e., the data information 200 in the analytics information 103) is not the same entity that consumed the analytics itself (the analytics consumer 900). This is the implementation example described in FIG. 9, where the entity consuming the "Analytics Data Trace" is the OAM 101. The response 901 of Nnwdaf_AnalyticsDataTrace_List service operation may contain the list of one or more "Analytics Data Trace ID" and/or the list of one or more "Data Trace ID" matching the provided filters at the request 102. Optionally, the response 901 could include the actual datasets of the "Analytics Data Trace" associated with the "Analytics Data Trace ID" and/or the "Data Trace Information" related to the "Data Trace ID" and/or a storage reference to retrieve these datasets (i.e., the data information 200 represented by the "Analytics Data Trace" and/or the "Data Trace Information" may be reference to data 202 or data 202 itself). In this implementation, the last case is described. When the datasets and/or the references for the storage of the datasets are not included in the response of the Nnwdaf_AnalyticsDataTrace_List service operation, the OAM 101 would still be configured to invoke the operation Nnwdaf_AnalyticsDataTrace_Query_request from the NWDAF 100 to actually retrieve the desired data information 200, based on the retrieved list of "Analytics Data Trace ID" and/or list of "Data Trace ID" from the response of the Nnwdaf_AnalyticsDataTrace_List service operation invocation.

In this implementation, the "Storage reference" included in the response 901 of the Nnwdaf_AnalyticsDataTrace_List service operation invocation may be a reference to a Data Lake entity 902 of the system.

The detailed steps of this implementation are described with respect to FIG. 9:

An analytics consumer 900 of an analytics outputs 201 from the NWDAF 100 invokes the NWDAF service Nnwdaf_AnalyticsSubscription_Subscribe with the existing parameters as defined in TS 23.288.

The NWDAF 100 creates the new dataset "Analytics Data Trace", and defines the unique identifier "Analytics Data Trace ID". This identifier can be either a UUID or an analytics trace correlation identifier, which relates the request 800 of the analytics ID to such "Analytics Data Trace ID". For instance, the correlation can be a function of the subscriber identification and the analytics ID.

Steps 3-5 can be repeated, until the conditions for the end of the subscription to receive the requested analytics ID in step 1 are reached.

The NWDAF 100 performs the analytics output generation (e.g., the NWDAF 100 calculates the analytics output 201 according to the requested "Analytics Target" and/or "Analytics Reporting" and/or "Analytics Filter" included in the request 800).

For the generated analytics output 201, the NWDAF 100 creates the "Data Trace Information" and defines the unique identifier "Data Trace ID" for the "Data Trace Information". The "Data Trace Information" is mapped and included as part of the "Analytics Data Trace" dataset for the "Analytics Trace ID" related to the generated analytics ID. When creating the "Data Trace Information", the NWDAF 100 includes in this information all the fields defined in Table 2.

The NWDAF 100 sends a response to the consumer 900 using the Nnwdaf_AnalyticsInfo_Request_response including the parameters as defined in TS 23.288.

The OAM 101 (e.g., upon the need to evaluate the performance of the algorithm used by the NWDAF 100 for the analytics ID Service Experience consumed by service management function (SMF) for a user plane (UP) optimization) requires the "Analytics Data Trace" information for an analytics ID for an analytics consumer 900 of such analytics ID. The OAM 101 invokes the Nnwdaf_AnalyticsDataTrace_List_request operation from the NWDAF 100, in order to provide the requests 102, using as filter the NF ID and the analytics ID. In this case, the OAM 101 wants to retrieve all the "Data Trace Information" generated for the analytics ID for such NF ID consumer. This filter information is used by NWDAF 100 to filter the "Analytics Data Trace" datasets, whose fields (as described in Table 3) are matching the filter information received in the service operation request. Then, the operation Nnwdaf_AnalyticsData-Trace_List_response (e.g., the output parameters indicated in Table 3) from the NWDAF 100 provides a response 901, which will contain the dataset of "Analytics Data Trace ID" for the requested analytics ID and NF consumer including the "Data Trace Information", as the analytics information 103 including the data information 200, as well as the reference for the entity storing such dataset (e.g., the Data Lake 902).

Based on the retrieved information from the NWDAF 100, the OAM 101 further interacts with the Data Lake 902 to retrieve the information associated with the "Analytics Data Trace ID".

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A first network entity for analytics generation of a mobile network, the first network entity comprising processing circuitry configured to:
   receive, from a second network entity, a request for providing analytics information associated with at least one generated analytics output; and
   provide the analytics information to the second network entity, wherein the analytics information comprises data information used to derive one or more insights in the at least one generated analytics output, wherein the data information comprises reference to data used to derive the one or more insights in the one or more analytics outputs,
   wherein the reference to data used to derive the one or more insights in the one or more analytics outputs comprises at least one of:
   a pointer to the data;
   a link to the data; or
   a timestamp indicating the time of data reception.

2. The first network entity according to claim 1, wherein:
   the request for providing the analytics information associated with the at least one generated analytics output comprises identification information for identifying the at least one generated analytics output.

3. The first network entity according to claim 1, wherein:
   the analytics information further comprises identification information for identifying the data information.

4. The first network entity according to claim 1, wherein the processing circuitry is further configured to:
   receive an activation request for tracing the data information used to generate the at least one generated analytics output; and
   trace the data information upon receiving the activation request.

5. The first network entity according to claim 1, wherein the processing circuitry is further configured to:
   maintain mapping information comprising one or more entries, each of the one or more entries being related to a generated analytics output,
   wherein each of the one or more entries comprises identification information associated with the respective generated analytics output, and comprises the data information used to derive the one or more insights in the respective generated analytics output.

6. The first network entity according to claim 5, wherein each of the one or more entries further comprises at least one of:
   an identifier of a network entity for analytics generation of a mobile network, which the network entity is used to generate the respective generated analytics output,
   a list of network entities consuming the respective generated analytics output,
   a type of the data information used to derive the one or more insights in the respective generated analytics output.

7. The first network entity according to claim 5, wherein:
   the mapping information further comprises, for each data information, at least one of:
   an identifier of the data information,
   a source of the data information,
   time information related to the data information,
   a manipulation technique applied to the data information.

8. The first network entity according to claim 1, wherein:
   the first network entity is a control plane entity comprising a network data analytics function (NWDAF), or
   the first network entity is a management plane entity comprising a management data analytics service (MDAS).

9. A second network entity for examining analytics generation of a mobile network, the second network entity comprising processing circuitry configured to:
   provide a request for analytics information associated with at least one generated analytics output to a first network entity for analytics generation; and
   receive the analytics information from the first network entity, wherein the analytics information comprises data information used to derive one or more insights in the at least one generated analytics output, wherein the data information comprises reference to data used to derive the one or more insights in the one or more analytics,
   wherein the reference to data used to derive the one or more insights in the one or more analytics outputs comprises at least one of:
   a pointer to the data;
   a link to the data; or
   a timestamp indicating the time of data reception.

10. The second network entity according to claim 9, wherein the processing circuitry is further configured to:
    provide an activation request for tracing the data information used to derive the one or more insights in the at least one generated analytics output.

11. The second network entity according to claim 9, wherein:
    the request for providing the analytics information associated with the at least one generated analytics output comprises identification information for identifying the at least one generated analytics output.

12. The second network entity according to claim 9, wherein:
the analytics information further comprises identification information for identifying the data information.

13. The second network entity according to claim 9, wherein the data information comprises the reference to the data, and the processing circuitry is further configured to:
send the analytics information comprising the data information to a third network entity; and
receive the data, which is referenced by the reference to the data in the data information, from the third network entity.

14. The second network entity according to claim 9, wherein:
the second network entity is a network function (NF), an application function (AF), or an operations, administration and management (OAM) function.

15. A method for analytics generation of a mobile network, the method comprising:
receiving a request for providing analytics information associated with at least one generated analytics output; and
providing the analytics information, wherein the analytics information comprises data information used to derive one or more insights in the at least one generated analytics output, wherein the data information comprises reference to data used to derive the one or more insights in the one or more analytics,
wherein the analytics information further comprises identification information for identifying the data information, and
wherein the reference to data used to derive the one or more insights in the one or more analytics outputs comprises at least one of:
a pointer to the data;
a link to the data; or
a timestamp indicating the time of data reception.

16. The method according to claim 15, further comprising:
receiving an activation request for tracing the data information used to derive the one or more insights in the at least one generated analytics output; and
tracing the data information upon receiving the activation request.

17. The method according to claim 15, further comprising:
marking the data information with respective identification information associated with a respective generated analytics output by maintaining mapping information comprising one or more entries, each of the one or more entries being related to the respective generated analytics output of the at least one generated analytics output,
wherein each of the one or more entries comprises the respective identification information associated with the respective generated analytics output, and comprises the data information used to derive the one or more insights in the respective generated analytics output.

18. A method for examining analytics generation of a mobile network, the method comprising:
providing a request for analytics information associated with at least one generated analytics output; and
receiving the analytics information, wherein the analytics information comprises data information used to derive one or more insights in the at least one generated analytics output, wherein the data information comprises reference to data used to derive the one or more insights in the one or more analytics,
wherein the reference to data used to derive the one or more insights in the one or more analytics outputs comprises at least one of:
a pointer to the data;
a link to the data; or
a timestamp indicating the time of data reception.

19. The method according to claim 18, further comprising:
providing an activation request for tracing the data information used to derive the one or more insights in the at least one generated analytics output.

20. A non-transitory computer-readable storage medium having computer-readable program codes stored thereon which, when executed, causes the processing circuitry to perform the method comprising:
receiving a request for providing analytics information associated with at least one generated analytics output; and
providing the analytics information, wherein the analytics information comprises data information used to derive one or more insights in the at least one generated analytics output, wherein the data information comprises reference to data used to derive the one or more insights in the one or more analytics outputs,
wherein the analytics information further comprises identification information for identifying the data information, and
wherein the reference to data used to derive the one or more insights in the one or more analytics outputs comprises at least one of:
a pointer to the data;
a link to the data; or
a timestamp indicating the time of data reception.

* * * * *